US008589360B2

(12) United States Patent
Li et al.

(10) Patent No.: US 8,589,360 B2
(45) Date of Patent: Nov. 19, 2013

(54) VERIFYING CONSISTENCY LEVELS

(75) Inventors: Xiaozhou Li, Palo Alto, CA (US);
Wojciech Golab, Palo Alto, CA (US);
Mehul A. Shah, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/323,577

(22) Filed: Dec. 12, 2011

(65) Prior Publication Data
US 2013/0151478 A1 Jun. 13, 2013

(51) Int. Cl.
*G06F 7/00* (2006.01)
*G06F 17/30* (2006.01)

(52) U.S. Cl.
CPC .............. *G06F 17/30371* (2013.01)
USPC .................... 707/690; 707/694

(58) Field of Classification Search
CPC ................................ G06F 17/30371
See application file for complete search history.

(56) References Cited

U.S. PATENT DOCUMENTS

| | | | | |
|---|---|---|---|---|
| 5,796,999 | A * | 8/1998 | Azagury et al. | 1/1 |
| 6,507,847 | B1 * | 1/2003 | Fleischman | 707/704 |
| 6,693,857 | B1 * | 2/2004 | Willis | 369/30.23 |
| 6,915,434 | B1 | 7/2005 | Kuroda et al. | |
| 7,203,105 | B2 * | 4/2007 | Nakanishi et al. | 365/191 |
| 7,490,263 | B2 * | 2/2009 | King | 714/6.13 |
| 7,624,108 | B1 * | 11/2009 | Goldberg et al. | 1/1 |
| 7,752,379 | B2 * | 7/2010 | Bellows et al. | 711/5 |
| 8,151,062 | B2 * | 4/2012 | Krishnaprasad et al. | 711/143 |
| 8,307,194 | B1 * | 11/2012 | Scott et al. | 712/34 |
| 2003/0163451 | A1 | 8/2003 | Amir et al. | |
| 2006/0101006 | A1 * | 5/2006 | Schofield | 707/3 |
| 2006/0277329 | A1 * | 12/2006 | Paulson et al. | 710/39 |
| 2007/0276873 | A1 * | 11/2007 | Vahdat et al. | 707/200 |
| 2008/0109466 | A1 * | 5/2008 | Havens et al. | 707/102 |
| 2009/0044174 | A1 | 2/2009 | Dolby et al. | |
| 2009/0125635 | A1 * | 5/2009 | Barga et al. | 709/231 |
| 2010/0192018 | A1 * | 7/2010 | Aiyer et al. | 714/37 |
| 2010/0199042 | A1 * | 8/2010 | Bates et al. | 711/114 |
| 2010/0241629 | A1 * | 9/2010 | Tatemura et al. | 707/741 |
| 2011/0276744 | A1 * | 11/2011 | Sengupta et al. | 711/103 |
| 2012/0078973 | A1 * | 3/2012 | Gerdes | 707/802 |

OTHER PUBLICATIONS

Shraer et al., Venus: Verification for Untrusted Cloud Storage, Oct. 8, 2010, http://www.zurich.ibm.com/~cca/papers/venus.pdf>.
Gstore: on Demand Atomicity in Key-value Stores, http://www.cs.ucsb.edu/~dsl/?q=gstore.
Golab et al., Analyzing Consistency Properties for Fun and Profit, PODC'11, Jun. 6-8, 2011, San Jose, CA.
Gibbons et al., Testing Shared Memories, Siam J. Comput, vol. 26, No. 4, pp. 1208-1244, Aug. 1997.

* cited by examiner

*Primary Examiner* — Miranda Le

(57) ABSTRACT

A method for verifying a consistency level in a key-value store, in which a value is stored in a cloud-based storage system comprising a read/write register identified by a key. At a centralized monitor node, a history of operations including writes and reads performed at the key is created, and a distance between a read of a value at the key and a latest write to the key is determined. It can then be ascertained whether the distance satisfies a relaxed atomicity property.

20 Claims, 6 Drawing Sheets

VERIFYING CONSISTENCY LEVELS

BACKGROUND

Large-scale key-value stores have become increasingly popular. A key-value store provides a simple get(key) and put(key,value) interface to the user. Providing strong consistency properties for these operations has become an increasingly important goal. However, the implementations of many key-value stores are proprietary and, as such, opaque to the users. Consequently, the users cannot reason about the implementations so as to be confident about their correctness. Instead, they can only test the system empirically, and analyze the test results (e.g., traces of operations) to see if the system is delivering the promised level of consistency. More useful consistency analysis can facilitate implementation of corrective actions (e.g., tuning the consistency level for future operations), and also provide a basis for proportional responses (e.g. compensation) to consistency violations.

DETAILED DESCRIPTION

Figure 1:
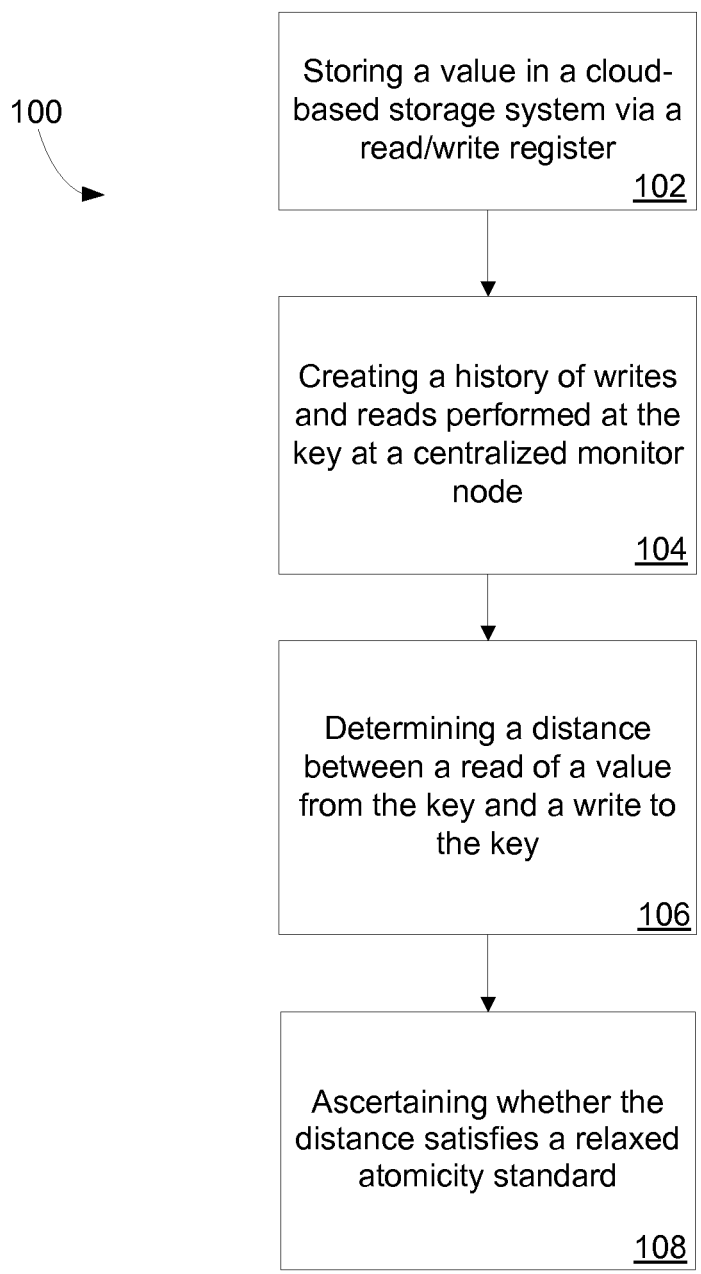
FIG. 1 is a flow diagram illustrating a method according to an example of the present technology.

Reference will now be made to the examples of the present technology illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Cloud computing applications provide storage solutions that are highly scalable and available, but can provide widely varying levels of consistency. High consistency requirements can result in increased cost and decreased availability. This is particularly a concern with many non-relational database systems, which can provide superior storage and access performance but often with weaker consistency guarantees. The present technology provides approaches for implementing stronger consistency in schema-less data storage solutions such as key-value stores.

One example of a key-value store can be modeled by a collection of read/write registers where each key identifies a register, and where get/put requests translate into read/write operations on the appropriate register. Given a history of operations (which can include e.g., the start time, finish time, argument, and response of every operation) on a read/write register, how can a determination be made as to whether the history satisfies certain consistency properties such as atomicity (i.e., linearizability)? The basic decision problem as addressed heretofore has sought only a yes/no answer to this question. The present technology focuses on a question that goes beyond a binary decision problem, that is, if the history is found to violate the desired consistency property, how the severity of the violations can be quantified. In the past, stores have avoided inconsistency altogether rather than briefly sacrificing consistency for better availability. The present technology provides a way to implement and verify relaxed consistency in a key-value store.

In describing the methods and systems of the present technology, the following discussion will describe a model and definitions illustrative of the present technology. Then several ways to quantify the severity of atomicity violations in a history are described. One quantity considered is the maximum staleness of all the reads of a history, where "staleness" reflects a distance between the value read as compared to the latest value written. In accordance with the present technology, "distance" can be defined in two ways. In one aspect, distance is based on the passage of time, e.g. between a read of a value and the write of that value. In another aspect, distance is based on the number of intervening writes, a notion that aligns with the concept of k-atomicity. Methods are presented here that compute the time-based distance and, for other cases, operation-count-based distance.

Description of the present technology can be facilitated by considering a model network that incorporates key-value storage. The model is included to illustrate one way in which the present technology can be implemented, and should not be understood to exclude other implementations. A collection of client machines interact with a key-value store via two interfaces: get(key) and put(key,value), where "key" and "value" are uninterpreted strings. In order to find out if the key-value store provides certain consistency properties, a client machine can assign a timestamp upon sending out a get/put request and upon receiving a response, and can record the value read or written by the operation. Since different client machines can access the same key, the individual client histories are sent to a centralized monitor node where the individual histories are merged. Furthermore, since accesses to different keys are independent of each other, the monitor node groups operations by key and then examines whether each group satisfies the desired consistency properties. In a specific aspect, all client machines can have well-synchronized clocks (which can be accomplished by time synchronization protocols such as NTP), or have access to a global clock, so that client timestamps can be considered to represent real time.

As noted above, a key-value store can be a collection of read/write registers, each identified by a unique key. The present technology can be viewed as dealing with a collection of operations on at least one such register. Each operation, either a read or a write, has a start time, finish time, and value. The value of a write is the value written to the register and the value of a read is the value obtained by the read. Note that the value of a write is known at the start of the write, but the value of a read is known only at the finish of the read.

For purposes of this discussion it can be assumed that all writes assign a distinct value. This assumption is made for two reasons. First, all writes can be tagged with a globally unique identifier, typically consisting of the local time of the client issuing the write followed by the client's identifier. Therefore, this assumption does not incur any loss of generality. Second, when the values written are not unique, the decision problem of verifying consistency properties is NP-complete for several well-known properties, particularly atomicity and sequential consistency.

Before proceeding with the description, certain terminology and notations will be defined. Operations on a read/write register can include an operation that puts a value there (i.e. a write), and an operation that references the key and gets the value (i.e. a read). An "event" is the start or finish of a read/write operation. In an aspect, the system has the ability to pair up start and finish events for the same operation. The start and finish times of operation op are denoted by op.s and op.f respectively. It is further assumed that all start and finish times are unique. Operation op is said to "time-precede" (or simply "precede") operation op', written as op<op', if op.f<op'.s. Operation op is said to "time-succeed" (or simply "succeed") op' iff op' time-precedes op. (The term "iff" denotes the condition "if and only if".) If neither op<op' nor op'<op, then we say op and op' are "concurrent" with each other, denoted by op∥op'.

In the following discussion, a "history" is a collection of events that describes a collection of operations, some of which may not have finished. A "full" history is one where all operations have finished. Without loss of generality, it can be assumed that a history H begins with an artificial pair of start/finish events for a write that assigns the initial value of the register. For a read, its "dictating write" is the unique write that assigns the value obtained by the read (assuming the uniqueness of write values). Typically, in a functioning system every read in a history has a dictating write. For a write, the set of reads that obtain the value written is called the "dictated reads" of the write. A write can have any number of dictated reads (including zero). The time-precedence relation defines a partial order on the operations in a history H. A total order of the operations in H is called "valid" if it conforms to the time-precedence partial order.

In concurrent computing, "atomicity" or "linearizability" reflects a consistency level in which an operation or set of operations appears to have an instantaneous effect on the whole system. A history is atomic iff there exists a valid total order on the operations such that every read returns the value of the latest write before it in the total order. This is a high standard to impose on a system, and does not admit application of a lower level of consistency (e.g. "near-atomicity" or "relaxed atomicity") where such would be sufficient. The present technology provides a method of quantifying violations of atomicity by operations, and of verifying whether a history including those operations satisfies a relaxed atomicity. Use of the term "atomicity" herein without a modifier refers to the standard definition of atomicity, and is to be distinguished from "relaxed atomicity."

In an example, a consistency level is verified in a key-value store that is part of a cloud-based storage system. The key-value store can comprise at least one read/write register that is identified by a key. As shown in FIG. 1, an example of such a method 100 can comprise a step 102 of storing a value in a cloud-based storage system. To assess the consistency of writes and reads at the register, the method includes a step 104 of creating a history of these operations at a centralized monitor node. Consistency is a concern where operations are performed at one key by multiple clients such that some operations may be concurrent. In a particular example, creating the history involves merging individual histories of operations performed at the key by multiple clients.

Once the history is created, it can be determined whether the history satisfies certain consistency properties such as atomicity. This can be accomplished using any of a number of known approaches for verifying atomicity. However, when the history is found to contain violations of atomicity, the present technology differs from prior approaches in providing quantification of the severity of violations. In an embodiment, verifying a relaxed atomicity comprises a step 106 of quantifying a distance between a read at a key and a preceding write to that key. In a specific aspect, the distance is between a read of a value and the write of that value to the key. The distance can then be analyzed in view of a relaxed atomicity in ascertaining 108 whether the distance violates or satisfies the relaxed atomicity. In a particular example, individual distances in a history can be used to produce a distance value from which it can be ascertained whether the history is atomic under the relaxed standard.

Time-Based Distance

In a particular embodiment, the distance is time-based, and can be determined by the passage of time between a write and a dictated read. According to the embodiment, these distances are used in connection with a time-based consistency property that allows a read to return either the value of the latest write preceding it, or the value of the latest write as of a real number of time units ago. In a specific aspect, the property is a generalization of atomicity, and can be defined for any non-negative real number. When this value is equal to zero, the atomicity it represents is identical to standard atomicity. This approach can be applied particularly to "simple" histories, i.e. histories contain neither reads that obtain a value that has never been written, nor reads that precede their own dictating write. Non-simple histories can be considered to have a violation severity of ∞. As a matter of practice it is straightforward to confirm that a history is simple, so it is simple histories that are considered henceforth in the discussion.

In one example, a time-based consistency value, termed "Δ-atomicity" in the following discussion, is based on a non-negative real number Δ. For a simple history H, let $H_\Delta$ be the history obtained from H by decreasing the start time of each read by Δ time units. H is found to be "Δ-atomic" iff $H_\Delta$ is atomic. Therefore, given a history H and Δ, checking if H is Δ-atomic comprises computing $H_\Delta$ from H and checking if $H_\Delta$ is atomic. For Δ=0, the two properties are identical, i.e. H is atomic.

Time-based consistency is based upon the relative timing of operations at a given register. Approaches to atomicity verification can incorporate certain features (termed "zones") that represent succinctly the timing information. Generally speaking, zones are time intervals between the finish of a particular operation in a history and the beginning of another operation in the history. In a specific aspect, a zone describes an interval between particular operations having significance regarding the state of the store.

Zones can be defined as follows. Let C(a) denote the cluster for value a, where a "cluster" refers to a set operations that take the same value. Let $\bar{s}(a)$ be the maximum start time of all the operations in C(a), that is, $\bar{s}(a)=\max\{op.s:op\in C(a)\}$. Let f(a) be the minimum finish time of all the operations in C(a), that is, $f(a)=\min\{op.f:op\in C(a)\}$. The zone for a value a, denoted by Z(a), is the closed interval of time between f(a) and $\bar{s}(a)$. If $f(a)<\bar{s}(a)$, this zone is called a "forward zone" and spans from f(a) to $\bar{s}(a)$. Otherwise, the zone is called a "backward zone" and spans from $\bar{s}(a)$ to f(a). Z.l and Z.r denote the left endpoint and right endpoint of zone Z. In other words, if Z(a) is a forward zone, then Z(a).l=f(a) and Z(a).r=$\bar{s}(a)$. If Z(a) is a backward zone, then Z(a).l=$\bar{s}(a)$ and Z(a).r=f(a). We write $Z_1 < Z_2$ iff $Z_1.r < Z_2.l$. A forward zone is denoted $\vec{Z}$, and $\overleftarrow{Z}$ denotes a backward zone.

Two zones $Z_1$ and $Z_2$ are said to conflict with each other (denoted by $Z_1 \chi Z_2$) iff they are both forward zones and they overlap, or one is a forward zone and the other is a backward zone contained entirely in the former forward zone. Two zones are compatible with each other, written as $Z_1 \sim Z_2$, iff they do not conflict. According to this definition, two backward zones cannot conflict. It has been demonstrated that a history is atomic iff (1) every read has a dictating write, (2) no read precedes its dictating write, and (3) all pairs of zones are compatible.

Some of the particular properties of $\Delta$-atomicity can be summarized thusly: (1) Two compatible zones remain so if we decrease the start times of the reads in these zones by arbitrary amounts. (2) For any simple history H, there exists a $\Delta \geq 0$ such that H is $\Delta$-atomic. (3) For any simple history H and $0 \leq \Delta \leq \Delta'$, if H is $\Delta$-atomic then it is also $\Delta'$-atomic.

An alternative, and somewhat more intuitive, definition of $\Delta$-atomicity can be stated: A simple history H is $\Delta$-atomic iff there exists an assignment of a unique timestamp to each operation such that: each timestamp is within the operation's time interval, and a read with timestamp t obtains either (1) the value of the write with the greatest timestamp $t' < t$, or (2) the value of the write with the greatest timestamp $t' < t - \delta(t)$ for some $\delta(t)$ such that $0 \leq \delta(t) \leq \Delta$.

In an example, verifying consistency under relaxed atomicity can include computing for a history H the smallest $\Delta \geq 0$ that makes H $\Delta$-atomic (i.e. makes $H_\Delta$ atomic). This approach further includes scoring conflicts between pairs of zones $Z_1$ and $Z_2$ (both of which are members of the complete set of zones for the history, Z), and assigning a score $\chi$, which quantifies the severity of the conflict between the zones. In a specific aspect, any $\chi \geq 0$ and $\chi(Z_1, Z_2) = \chi(Z_2, Z_1)$. In a sense, the $\chi$ for two zones is the minimum value of $\Delta$ that eliminates any conflict between the zones.

Computing $\chi$ can be understood by considering first the effect of decreasing the starting times of the reads in H by $\Delta$. For a zone that does not contain any reads, there is no effect. For a forward zone, which necessarily contains at least one read, the right endpoint of the zone shifts to the left, up to the limit where the forward zone collapses into a single point. Once this limit is reached, any further shift results in the zone becoming a backward zone. For any backward zone containing at least one read, the left endpoint of the zone shifts to the left, up to the limit where the left endpoint coincides with the start of the dictating write. Beyond this limit there is no effect. Thus, for a sufficiently large $\Delta$, all zones become backward zones, and there are no conflicts.

Figure 2:
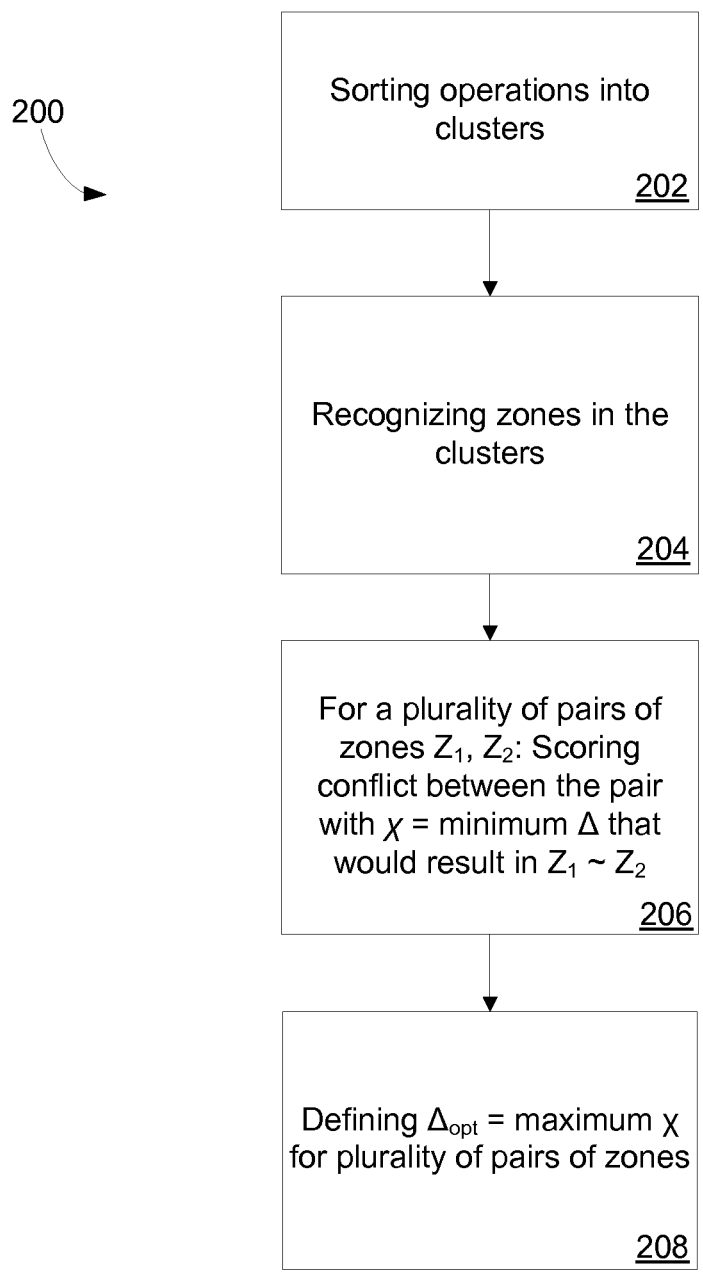
FIG. 2 is a flow diagram illustrating further details of a step in the method shown in FIG. 1.

FIG. 2 shows an example of a more specific process 200 for determining a time-based distance in accordance with the above approach, that is, a step 202 of sorting operations into clusters and then the step 204 of recognizing the zones present in the clusters. Step 206 comprises scoring pairs of zones, and in step 208 the maximum score found for the pairs is used to define a distance $\Delta_{opt}$ for the history.

Figure 3:
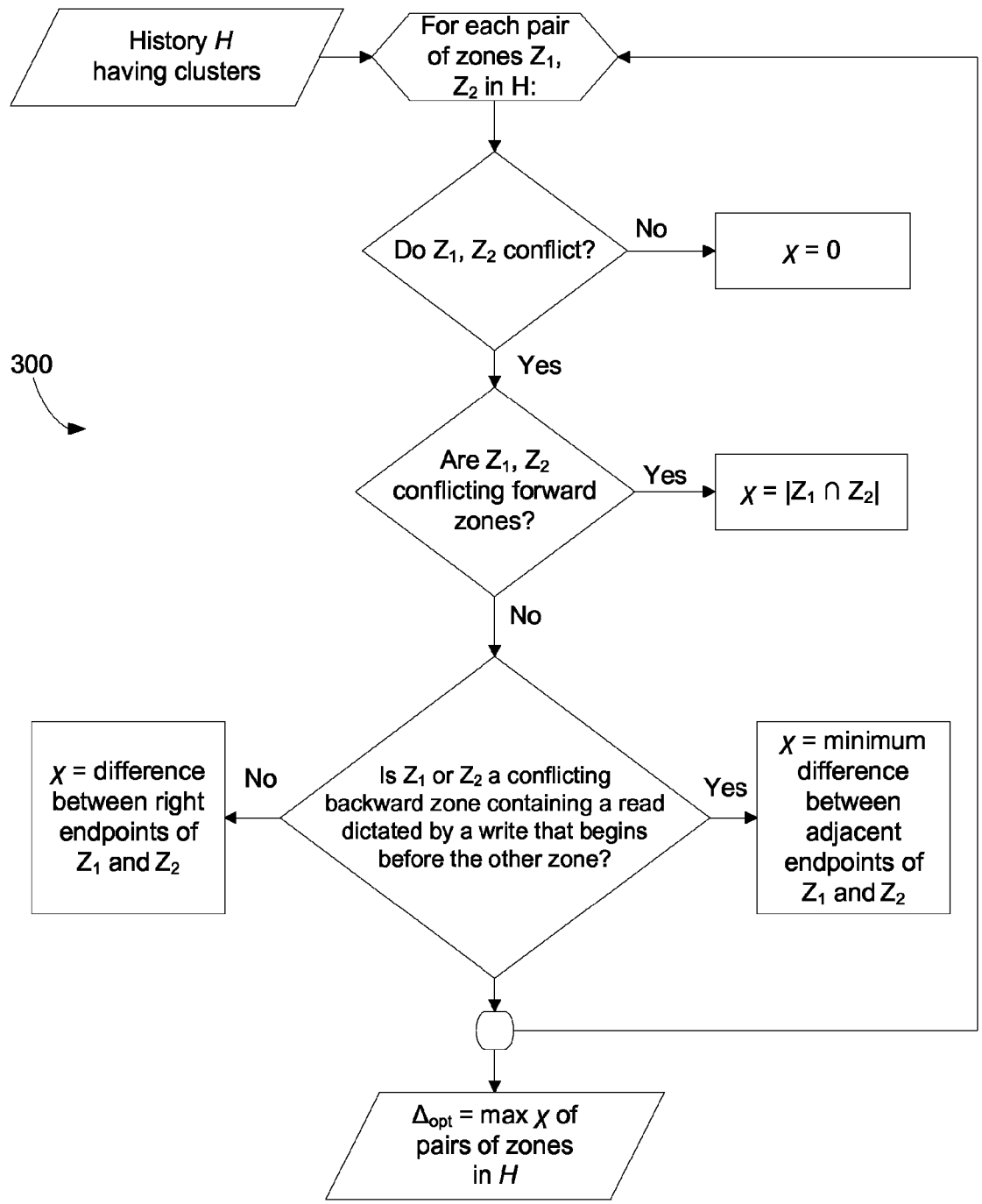
FIG. 3 is a flow diagram illustrating a scoring process in a particular example of the method.

The scoring function $\chi(Z_1, Z_2)$ can be defined more precisely as described below. An example of a process 300 using this approach is shown in FIG. 3. Let $Z_1 \cap Z_2$ denote the time interval corresponding to the intersection of $Z_1$ and $Z_2$, and let $|Z_1 \cap Z_2|$ denote the length of this intersection interval. Scores are assigned according to the following strategy:

1. If $Z_1 \sim Z_2$, then $\chi(Z_1, Z_2) = 0$.
2. If $Z_1$, $Z_2$ are conflicting forward zones, then $\chi(Z_1, Z_2) = |Z_1 \cap Z_2|$. Applying this $\Delta$ to all of the reads has the effect of shifting the right endpoint of the zone that finishes earliest until either this zone becomes a backward zone, or its right endpoint meets the left endpoint of the other zone.
3. If $Z_1$ is a forward zone and $Z_2$ is a conflicting backward zone that contains at least one read and whose dictating write begins before $Z_1.f$, then $\chi(Z_1, Z_2) = \min(Z_1.\bar{s} - Z_2.f, Z_2.\bar{s} - Z_1.f)$. Stated differently, the score is the smaller of the differences between adjacent endpoints of the two zones. This shifts the right endpoint of the forward zone and the left endpoint of the backward zone by the smallest amount ensuring that the forward zone no longer contains the backward zone.
4. If $Z_1$ is a forward zone and $Z_2$ is a conflicting backward zone of any other kind, then $\chi(Z_1, Z_2) = Z_1.\bar{s} - Z_2.f$. This shifts the right endpoint of the forward zone until the forward zone no longer contains the backward zone. Shifting the backward zone does not help.

It follows from the discussion above that increasing $\Delta$ eliminates existing conflicts and does not create new ones. Consequently, applying a $\Delta_{opt} = \max\{\chi(Z_1, Z_2) : Z_1, Z_2 \in Z\}$ eliminates all conflicts among the zones in $H_\Delta$, and ensures that $H_\Delta$ is atomic. Furthermore, no smaller $\Delta$ has the latter property, i.e. $\Delta_{opt} = \min\{\Delta : H_\Delta \text{ is atomic}\}$. Therefore computing $\Delta_{opt}$ for a history H involves tabulating scores for pairs of distinct zones and taking the maximum of the scores.

Another example of a time-based consistency value in accordance with the present technology can be based on a different value, termed here as $\lambda$. For a simple history H, let $H_\lambda$ be the history obtained from H by shifting both the start time and finish time of each read and write in the history. More specifically, the start event for each operation is shifted left by $\lambda$ time units, while the finish event is shifted right by $\lambda$ time units. In this case, H is found to be "$\lambda$-atomic" iff $H_\lambda$ is atomic.

Similar to the approach described for $\Delta$-atomicity, verifying consistency under $\lambda$-atomicity can include computing the smallest $\lambda \geq 0$ that makes a history H$\lambda$-atomic (i.e. makes $H_\lambda$ atomic). A scoring function $\chi(Z_1, Z_2)$ for two zones $Z_1$ and $Z_2$ can be defined as described as follows:

1. If $Z_1 \sim Z_2$, then $\chi(Z_1, Z_2) = 0$.
2. If $Z_1$, $Z_2$ are conflicting forward zones, then $\chi(Z_1, Z_2) = |Z_1 \cap Z_2|/2$. Applying this $\lambda$ to all operations has the effect of shifting the adjacent endpoints of the zones until the zones no longer overlap.
3. If $Z_1$ is a forward zone and $Z_2$ is a conflicting backward zone, then $\chi(Z_1, Z_2) = \min(Z_1.\bar{s} - Z_2.f, Z_2.\bar{s} - Z_1.f)/2$. This shifts the endpoint of the forward zone and the endpoint of the backward zone that are closest to each other until the forward zone no longer contains the backward zone.

Figure 4:
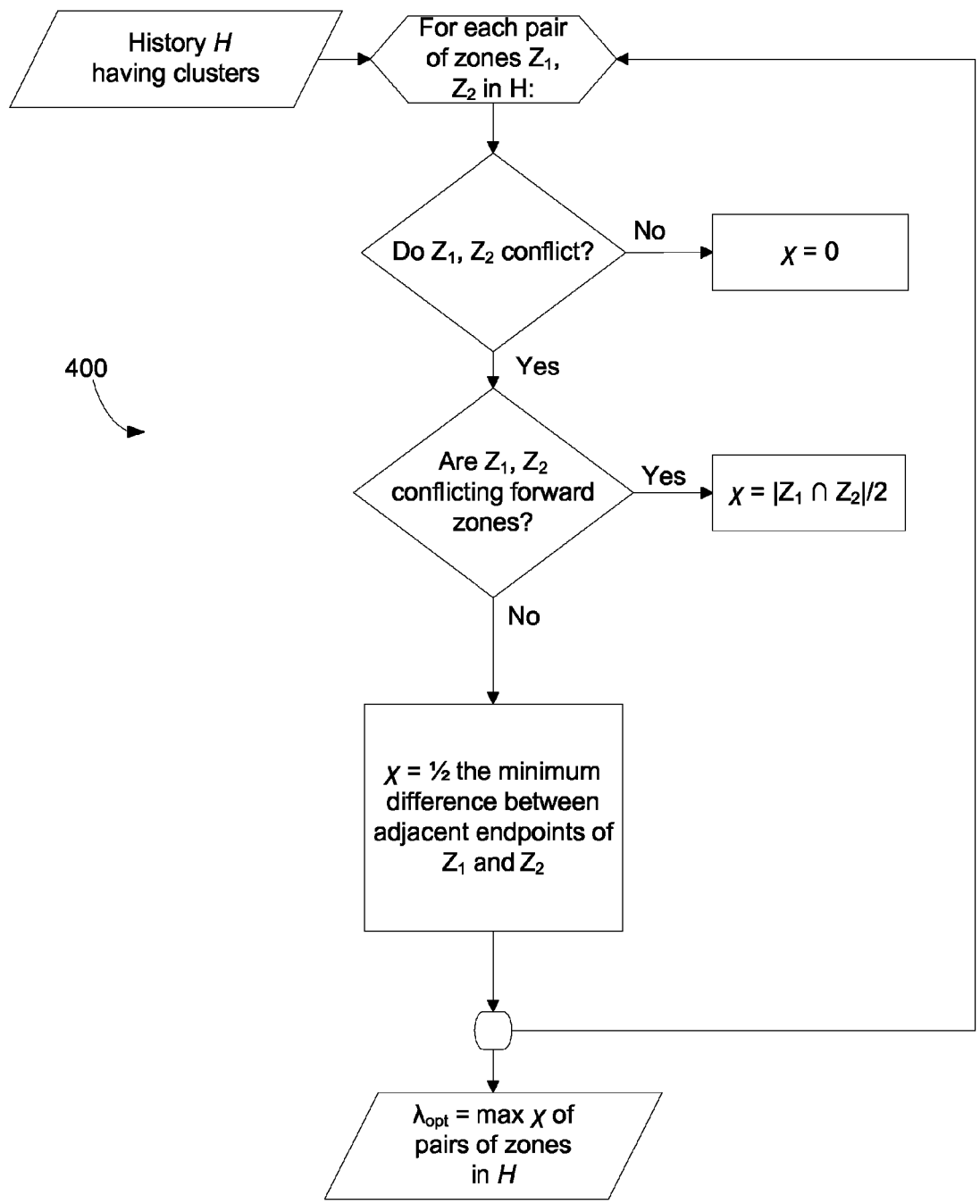
FIG. 4 is a flow diagram illustrating a scoring process in another particular example of the method.

An example of a process 400 using this strategy is shown in FIG. 4. As with $\Delta_{opt}$, applying a $\lambda_{opt} = \max\{\chi(Z_1, Z_2) : Z_1, Z_2 \in Z\}$ eliminates all conflicts among the zones in $H_\lambda$, and ensures that $H_\lambda$ is atomic. Furthermore, $\lambda_{opt}$ is the smallest value of $\lambda$ that accomplishes this. Therefore computing $\lambda_{opt}$ for a history H involves tabulating scores for pairs of distinct zones and taking the maximum of the scores.

In a sense, time-based consistency values such as $\Delta_{opt}$ and $\lambda_{opt}$ can each be considered to quantify an extent to which H violates standard atomicity. However, their particular nature as numerical quantities facilitates their use in verification of relaxed atomicity. That is, once the consistency value is obtained for a history, it can be ascertained whether the history satisfies a specific relaxed atomicity standard. For example a relaxed level of atomicity, represented by a preselected target value of $\Delta$, can be utilized in assessing the performance of a key-value store. If the $\Delta_{opt}$ for a history of operations on the store is less than or equal to the preselected $\Delta$, the history can be found to satisfy the relaxed atomicity. As discussed above, for $0 \leq \Delta \leq \Delta'$, if H is $\Delta$-atomic then it is also $\Delta'$-atomic. Likewise, where $0 \leq \Delta_{opt} \leq \Delta$, an H that is atomic at $\Delta_{opt}$ is also atomic at the greater $\Delta$. Conversely, if the $\Delta_{opt}$ for a history of operations on the store is greater than the preselected $\Delta$, the history can be recognized as violating the relaxed atomicity represented by $\Delta$.

It is noted that there is no particular limitation on the target consistency value (e.g. $\Delta$ or $\lambda$) can be selected, as these values can in theory take on any non-zero value and the consistency level will be chosen based on the particular purpose. In the specific examples of Δ and λ, a target value for either can be from about 0.001 milliseconds to about 10 minutes. In a more specific example, a target value is from about 0.001 milliseconds to about 1000 milliseconds. In another specific example, a target value is from about 1 to about 100 seconds.

Operation-Count-Based Distance

In another embodiment, verifying consistency under relaxed atomicity can comprise quantifying a distance based on a number of intervening writes between a read of a value and the write of that value. This approach incorporates the concept of "k-atomicity", in which a history is considered k-atomic iff there exists a valid total order of the operations such that every read obtains the value of one of the k latest writes before it in the total order. By this definition, standard atomicity is identical to atomicity at k=1 or "1-atomicity". The present method can be applied to verifying a relaxed k-atomicity, e.g. k=2 or "2-atomicity". This approach can be used in histories where every write has at least one dictated read and where every read succeeds its dictated write. For these histories, it can be assumed without loss of generality that each write in the history has exactly one dictated read, because if a write has multiple dictated reads, the history can be condensed by keeping, for every write, the dictated read that starts last and remove the other reads. If a k-atomic total order exists for the condensed history, then the removed reads can be added back to the total order without destroying the k-atomicity. Therefore, it suffices to consider only such condensed histories in this discussion.

For purposes of the describing the present approach, histories are considered that are simple as defined above, and in which each write has exactly one dictated read, and each read succeeds its dictating write. In an embodiment, one task can be that of ordering the operations in the history so as to minimize the number of intervening writes between each write and the read dictated by that write. For example, once an order of the writes is found for a history, then there is an order in which the reads can be laid out so that for each value a, the number of writes between the dictating write w(a) and dictated read r(a) is the smallest possible. If the number of intervening writes is less than or equal to 2, it can be said that the order of operations satisfies 2-atomicity. Assuming that the total order is such that preceding operations in the history appear on the left of succeeding ones, then the way to put the read is to put it immediately after the rightmost write that precedes this read. The order of reads between two writes is unimportant. If the order of the writes is fixed, then this is the appropriate place to put this read. In other words, the principal task for the algorithm is to decide is the order of the writes. Once the order of the writes is decided, where to best place the reads can then be decided.

Figure 5:
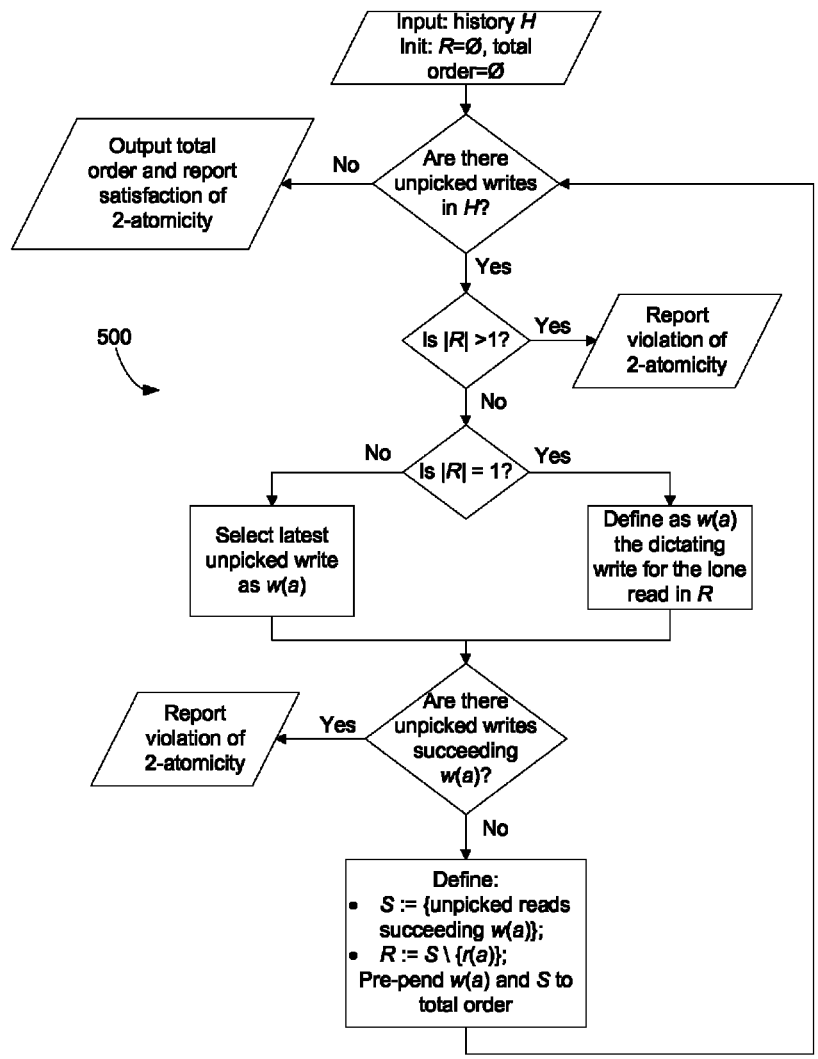
FIG. 5 is a flow diagram illustrating computing steps in another example of the method.

An overall strategy of the method can be to lay out the writes from right to left, generally in the order of decreasing finish times, but in the meantime being mindful about the additional constraints imposed by previously placed writes. An example process 500 for verifying 2-atomicity is presented in FIG. 5. This method can be understood as proceeding by placing the writes from right to left. When there are no other constraints, a write w(a) that has the largest (i.e. latest) finish time among the currently unpicked writes is picked next. Once w(a) is laid out, the set S is computed, S being the unpicked reads that succeed w(a) in the history. Let the set R equal all unpicked reads in S that are not dictated by w(a), i.e. S\{r(a)}. If R is not empty, then because of the 2-atomicity requirement there are additional constraints on what the next write should be. In particular, if |R|>1 (i.e. R contains reads dictated by more than one write), then it means that multiple writes would have to be laid in the next place in order to keep the 2-atomicity requirement. This is not workable, so in this situation the process reports a violation of 2-atomicity. If R contains reads only dictated by a single write, then the clear next step is to lay out that dictating write. If |R|=0, then any unpicked write may be picked.

According to the above approach, the unpicked write having the latest finishing time is picked. One rationale for picking writes in this manner is that it results in the fewest number of reads that would follow each write in the total order. Once the process achieves successful ordering of all of the writes and reads according to the above approach, i.e. where each read is dictated by one of two writes immediately preceding that read, it can be reported that the history satisfies 2-atomicity.

In accordance with the present technology, a distributed storage system can incorporate a relaxed atomicity such as described above. Such a system can include one or more servers on which a key-value store is embodied and which is accessible by one or more client machines. The system can further include a relaxed atomicity embodied therein, and instructions for quantifying and verifying the atomicity of histories of operations made on the registers of the key-value store. In one aspect, modules and instructions for these functions can be distributed among the machines that make up the system. In another aspect, an existing storage system can be modified to provide the functions discussed herein by the addition of a machine ("monitor") that includes modules or instructions for quantifying and verifying atomicity.

Figure 6:
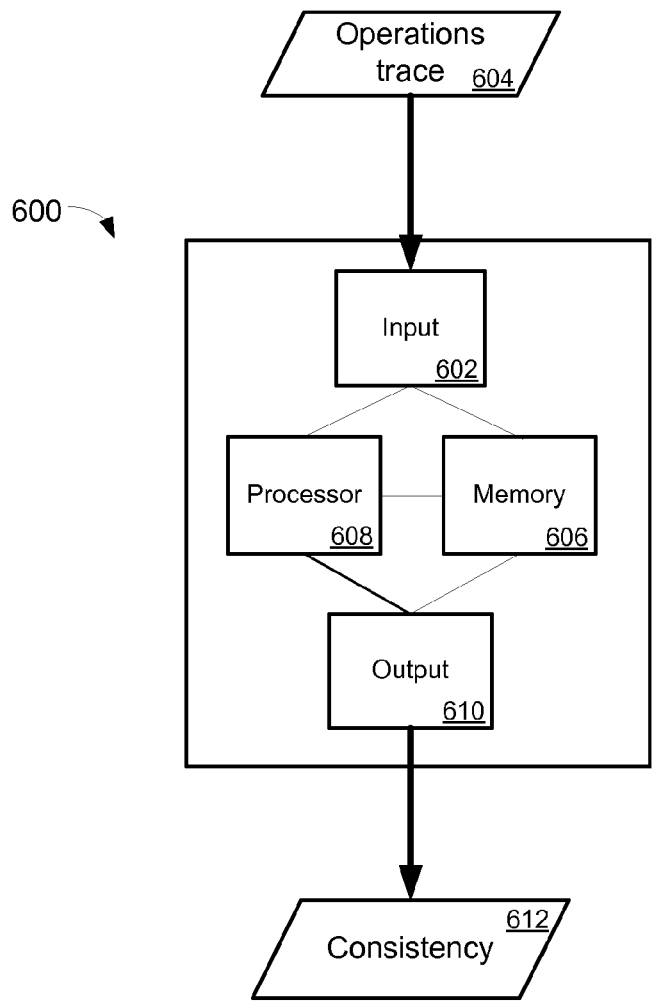
FIG. 6 is a schematic diagram of a system according to an example of the present technology.

In an example of the present technology, a monitor for verifying a consistency level in a key-value store can be configured to interface with a storage system that includes a key-value store, quantify the severity of any violations of atomicity in a history of operations on the store, and ascertain whether the history satisfies a relaxed atomicity standard. In a particular aspect, the monitor can be configured for inclusion in a large-scale storage system, such as a cloud-based system. As described above, the key-value store can comprise a plurality of read/write registers, each identified by a unique key. In a particular example shown in FIG. 6, the monitor 600 can comprise an input module 602 for receiving a trace of operations 604 made on the store through a read/write register. The trace of operations can comprise a plurality of operation histories generated by individual clients that have accessed the store, which may then be merged by the monitor. In another aspect, the trace of operations are received after having been at least partially merged.

The monitor includes components for manipulating and analyzing the operations for consistency. In an example, the monitor includes a memory 606 on which are tangibly embodied instructions to perform a process for verifying consistency in accordance with any of the examples described above. In one example, the instructions set forth a process for creating a history of writes and reads from the received trace of operations; quantifying a distance between a write of a value at the key and a read of the value; and ascertaining whether the distance satisfies a relaxed atomicity standard. The monitor can include a processor 608 for executing the instructions in memory and performing the process. The processor can optionally include two or more modules for performing subsets of the process. A relaxed atomicity standard by which the consistency is evaluated is represented in the monitor. The monitor can further include an output device 610 for reporting the consistency level 612 ascertained by the process.

As discussed above in describing methods of the present technology, two approaches to quantifying distance can be embodied in the monitor. In one example, the distance comprises a passage of time. In accordance with this approach, the relaxed atomicity standard represented in the system is time-based. In a specific example, relaxed atomicity is represented as a target value of $\Delta$. Scoring of zone conflicts to produce $\Delta_{opt}$ occurs as described above, and the output device reports satisfaction of the relaxed atomicity standard where $\Delta_{opt}$ is less than or equal to the target $\Delta$. In another specific example, a relaxed atomicity is represented as a target value of $\lambda$, where scoring of zone conflicts produces $\lambda_{opt}$ of the history which can be compared to $\lambda$. In another example, the distance comprises a number of intervening writes between the write of the value and the read of the value. The processor implementing this approach attempts to order the operations as described above, and the output device reports satisfaction of the relaxed atomicity standard where a maximum number of intervening writes in the history is less than or equal to 2.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

Instructions for quantifying or verifying atomicity according to the present technology can be provided on a medium for installation and implementation of these functions on existing machines. In a particular example, a computer readable medium can have tangibly embodied thereon instructions for execution by a processor in performing a process for verifying a consistency level in a key-value store. The medium can include instructions for: receiving a trace of operations made on a key-value store through a read/write register, wherein the read/write register is identified by a key; creating from the trace a history of writes and reads performed at the key; quantifying a distance between a write of a value at the key and a read of the value; ascertaining whether the distance satisfies a relaxed atomicity standard; and reporting the consistency level of the history.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method, comprising:
   storing a value in a cloud-based storage system comprising a read/write register identified by a key;
   creating at a monitor a history of operations including writes and reads performed at the key;
   quantifying a distance between a read of a value at the key and a latest write to the key, wherein the latest write to the key is subsequent to the read of the value; and
   ascertaining whether the distance satisfies a relaxed atomicity standard, wherein the distance between the write and the read is one selected from a quantity based on a passage of time between the read of the value at the key and the latest write to the key and a quantity of intervening writes between the read of the value at the key and the latest write to the key.

2. The method of claim 1, wherein the distance between the write and the read is quantified by measuring a passage of time.

3. The method of claim 2, wherein quantifying the distance comprises:

sorting the operations in the history into clusters, wherein each cluster comprises operations taking one value;

recognizing zones in each cluster, wherein zones are time intervals between operations scoring a conflict between a pair of zones $Z_1$ and $Z_2$ with a score $\chi$, where $\chi$ is the minimum time ($\Delta$) by which decreasing the start times of reads in the history results in the pair of zones $Z_1$ and $Z_2$ being compatible; and designating $\Delta_{opt}$ as a maximum $\chi$ calculated for a plurality of pairs of zones in the history.

4. The method of claim 3, comprising setting $\chi$ equal to the length of an intersection of zones $Z_1$ and $Z_2$ when said zones are forward conflicting zones.

5. The method of claim 3, comprising setting $\chi$ equal to a difference between endpoints of zones $Z_1$ and $Z_2$ when said zones are a forward zone and a conflicting backward zone.

6. The method of claim 5, wherein the difference is a minimum difference between adjacent endpoints of the zones when the backward conflicting zone contains a read dictated by a write beginning earlier than the forward zone.

7. The method of claim 2, wherein quantifying the distance comprises:

sorting the operations in the history into clusters, wherein each cluster comprises operations taking one value;

recognizing zones in each cluster, wherein zones are time intervals between operations;

scoring a conflict between a pair of zones $Z_1$ and $Z_2$ with a score $\chi$, where $\chi$ is the minimum time ($\lambda$) by which decreasing the start times and increasing the finish times of operations in the history results in the pair of zones $Z_1$ and $Z_2$ being compatible; and designating $\lambda_{opt}$ as a maximum $\chi$ calculated for a plurality of pairs of zones in the history.

8. The method of claim 7, comprising setting $\chi$ equal to one-half the length of an intersection of zones $Z_1$ and $Z_2$ when said zones are forward conflicting zones.

9. The method of claim 7, comprising setting $\chi$ equal to one-half the smaller difference between endpoints of zones $Z_1$ and $Z_2$ when said zones are a forward zone and a conflicting backward zone.

10. The method of claim 1, wherein creating the history comprises ordering a plurality of operations in the history so as to minimize a number of intervening writes between each write and the read dictated by that write.

11. The method of claim 10, wherein ordering the plurality of operations comprises:

selecting a write w(a), where w(a) has a latest finish time among writes yet to be placed;

computing a set S of unpicked reads that succeed w(a) in the history;

computing the set R defined as the unpicked reads in S not dictated by w(a);

placing the write dictating a lone read in R when |R|=1; and placing a write having the latest finish time of the remaining writes yet to be placed when |R|=0.

12. The method of claim 11, comprising reporting a violation of the relaxed atomicity standard when |R|>1.

13. A monitor, comprising:

an input module to receive a trace of operations made through a read/write register of a cloud-based storage system, wherein the read/write register is identified by a key;

a relaxed atomicity standard;

a memory;

at least one hardware processor connected to the memory, the at least one hardware processor to:

create, from the trace, a history of writes and reads performed at the key; quantify a distance between a write of a value at the key and a read of the value, wherein the write of the value at the key is subsequent to the read of the value; and ascertain whether the distance satisfies a relaxed atomicity standard, wherein the distance between the write and the read is one selected from a quantity based on a passage of time between the read of the value at the key and the latest write to the key and a quantity of intervening writes between the read of the value at the key and the latest write to the key.

14. The monitor of claim 13, wherein the distance between the write and the read comprises a passage of time.

15. The monitor of claim 14, wherein quantifying the distance comprises:

dividing the operations in the history into clusters, wherein each cluster comprises operations taking one value;

recognizing zones in each cluster, wherein zones are time intervals between operations;

scoring a conflict between a pair of zones $Z_1$ and $Z_2$ with a score $\chi$, where $\chi$ is the minimum time ($\Delta$) by which decreasing the start times of reads in the history results in the pair of zones $Z_1$ and $Z_2$ being compatible; and designating $\Delta_{opt}$ as a maximum $\chi$ calculated for a plurality of pairs of zones in the history.

16. The monitor of claim 14, wherein quantifying the distance comprises:

dividing the operations in the history into clusters, wherein each cluster comprises operations taking one value;

recognizing zones in each cluster, wherein zones are time intervals between operations;

scoring a conflict between a pair of zones $Z_1$ and $Z_2$ with a score $\chi$, where $\chi$ is the minimum time ($\lambda$) by which decreasing the start times and increasing the finish times of operations in the history results in the pair of zones $Z_1$ and $Z_2$ being compatible; and designating $\lambda_{opt}$ as a maximum $\chi$ calculated for a plurality of pairs of zones in the history.

17. The monitor of claim 13, wherein the processor is further to:

order a plurality of operations in the history so as to minimize a number of intervening writes between each write and the read dictated by that write, and determine that the distance satisfies the relaxed atomicity standard when a maximum number of intervening writes in the history is less than or equal to 2.

18. The monitor of claim 17, wherein ordering the plurality of operations comprises:

selecting a write w(a), where w(a) has a latest finish time among writes yet to placed;

computing a set S of unpicked reads that succeed w(a) in the history;

computing the set R defined as the unpicked reads in S not dictated by w(a);

placing the write dictating a lone read in R when |R|=1; and placing an write having the latest finishing time of the remaining writes yet to be placed when |R|=0.

19. The monitor of claim 18, wherein the processor is further to identify a violation of the relaxed atomicity standard when |R|>1.

20. A non-transitory computer readable medium having tangibly embodied thereon instructions for execution by a processor to perform a process comprising:

receiving a trace of operations made through a read/write register of a cloud-based storage system, wherein the read/write register is identified by a key;

creating from the trace a history of writes and reads performed at the key;
quantifying a distance between a write of a value at the key and a read of the value, wherein the write of the value is subsequent to the read of the value; and
ascertaining whether the distance satisfies a relaxed atomicity standard, wherein the distance between the write and the read is one selected from a quantity based on a passage of time between the read of the value at the key and the latest write to the key and a quantity of intervening writes between the read of the value at the key and the latest write to the key.

\* \* \* \* \*

UNITED STATES PATENT AND TRADEMARK OFFICE
CERTIFICATE OF CORRECTION

PATENT NO. : 8,589,360 B2  
APPLICATION NO. : 13/323577  
DATED : November 19, 2013  
INVENTOR(S) : Xiaozhou Li et al.

Page 1 of 1

It is certified that error appears in the above-identified patent and that said Letters Patent is hereby corrected as shown below:

In the Claims

In column 11, line 54, in Claim 11, delete "a lone" and insert -- alone --, therefor.

In column 12, line 51, in Claim 18, delete "to" and insert -- to be --, therefor.

In column 12, line 56, in Claim 18, delete "a lone" and insert -- alone --, therefor.

Signed and Sealed this  
Twenty-seventh Day of May, 2014

Michelle K. Lee  
*Deputy Director of the United States Patent and Trademark Office*